(12) United States Patent
Eklund et al.

(10) Patent No.: US 8,876,164 B2
(45) Date of Patent: Nov. 4, 2014

(54) MUD FLAP BRACKET ASSEMBLY

(71) Applicant: Fleet Engineers, Incorporated, Muskegon, MI (US)

(72) Inventors: Wesley K. Eklund, Muskegon, MI (US); Tom Gerst, Twin Lake, MI (US); Gary Roberts, Fruitport, MI (US)

(73) Assignee: Fleet Engineers, Incorporated, Muskegon, MI (US)

( * ) Notice: Subject to any disclaimer, the term of this patent is extended or adjusted under 35 U.S.C. 154(b) by 98 days.

(21) Appl. No.: 13/756,808

(22) Filed: Feb. 1, 2013

(65) Prior Publication Data

US 2013/0193300 A1 Aug. 1, 2013

Related U.S. Application Data

(60) Provisional application No. 61/593,647, filed on Feb. 1, 2012.

(51) Int. Cl.
*B62D 25/18* (2006.01)
*B62D 25/16* (2006.01)

(52) U.S. Cl.
CPC ............ *B62D 25/163* (2013.01); *B62D 25/188* (2013.01)
USPC ............................ 280/851; 280/848; 280/154

(58) Field of Classification Search
CPC ... B62D 25/188; B62D 25/163; B62D 25/168
USPC ............... 248/610, 309.1; 280/851, 848, 154, 280/847, 159
See application file for complete search history.

(56) References Cited

U.S. PATENT DOCUMENTS

| | | | | | |
|---|---|---|---|---|---|
| 2,652,266 | A | * | 9/1953 | Miller | 280/851 |
| 2,660,453 | A | * | 11/1953 | Russell et al. | 280/851 |
| 2,801,867 | A | * | 8/1957 | Childreth | 280/851 |
| 2,935,336 | A | * | 5/1960 | Case | 280/851 |
| 3,224,791 | A | * | 12/1965 | Sogoian | 280/851 |
| 3,401,953 | A | * | 9/1968 | Prohl et al. | 280/851 |
| 3,711,119 | A | * | 1/1973 | Hollingsworth | 280/851 |
| 3,782,757 | A | | 1/1974 | Juergens | |
| 3,848,842 | A | * | 11/1974 | Jepsen | 248/560 |
| 3,940,165 | A | * | 2/1976 | Sogoian | 280/851 |
| 3,954,281 | A | | 5/1976 | Juergens | |
| 3,999,776 | A | * | 12/1976 | Betts, Sr. | 280/851 |
| 4,007,944 | A | * | 2/1977 | Dingess | 280/851 |
| 4,165,092 | A | | 8/1979 | Herlein | |
| 4,180,230 | A | * | 12/1979 | Sogoian | 248/573 |
| 4,189,165 | A | * | 2/1980 | Leonard et al. | 280/851 |
| 4,352,502 | A | * | 10/1982 | Leonard et al. | 280/851 |
| 4,354,690 | A | * | 10/1982 | Hanson | 280/851 |
| 4,627,594 | A | * | 12/1986 | Reed | 248/632 |
| 4,726,599 | A | * | 2/1988 | Antekeier et al. | 280/851 |
| 4,877,267 | A | * | 10/1989 | Leonard | 280/848 |

(Continued)

*Primary Examiner* — Terrell McKinnon
*Assistant Examiner* — Daniel Breslin
(74) *Attorney, Agent, or Firm* — McGarry Bair PC

(57) ABSTRACT

A mud flap bracket assembly comprises a functional frame bracket assembly and one or more interchangeable bracket covers. The frame bracket assembly has unitary frame bracket that is formed from a sheet metal blank that is configured to form and integral spring mount and integral slots to mount a frame seat. The frame bracket has integral slots that mount mud flap clips that are adjustable within the slots for mounting mud flaps of different hole configurations. The frame bracket assembly is assembled with integral fasteners and without welds.

21 Claims, 8 Drawing Sheets

(56) References Cited

U.S. PATENT DOCUMENTS

| | | | | |
|---|---|---|---|---|
| 4,960,294 A | * | 10/1990 | Leonard | 280/848 |
| 5,938,222 A | * | 8/1999 | Huang | 280/154 |
| 6,116,628 A | * | 9/2000 | Adrian | 280/154 |
| 6,164,804 A | * | 12/2000 | Self | 362/485 |
| 6,443,492 B1 | * | 9/2002 | Barr et al. | 280/851 |
| 6,604,724 B2 | * | 8/2003 | Hawes et al. | 248/309.1 |
| 6,827,372 B2 | * | 12/2004 | Barr et al. | 280/847 |
| 7,708,315 B1 | * | 5/2010 | Dumitrascu | 280/848 |
| 8,398,150 B2 | * | 3/2013 | Brown et al. | 296/180.4 |
| 8,579,359 B2 | * | 11/2013 | Brown et al. | 296/180.4 |
| 2001/0032914 A1 | | 10/2001 | Hawes | |

\* cited by examiner

MUD FLAP BRACKET ASSEMBLY

CROSS REFERENCE TO RELATED APPLICATIONS

This application claims the benefit of U.S. provisional application Ser. No. 61/593,647, filed Feb. 1, 2012, which is incorporated herein in its entirety.

BACKGROUND OF THE INVENTION

1. Field of the Invention

This invention relates to a mud flap bracket assembly. In one of its aspects, the invention relates to a mud flap bracket assembly having a frame bracket assembly with an interchangeable bracket cover. In another of its aspects, the invention relates to a mud flap bracket assembly having a spring end mount that is integrated with the frame bracket assembly frame. In another of its aspects, the invention relates to a mud flap bracket assembly that has an aerodynamic body. In another of its aspects, the invention relates to a mud flap bracket assembly that has integrated adjustable mud flap slots. In another of its aspects, the invention relates to a mud flap bracket assembly that has mud flap mount locking tabs. In another of its aspects, the invention relates to a mud flap bracket assembly that has integrally formed frame reinforcing ribs. In another of its aspects, the invention relates to a mud flap bracket assembly that has a frame with an integrally formed spring end mount. In another of its aspects, the invention relates to a mud flap bracket assembly that has a spring end mount without fasteners. In another of its aspects, the invention relates to a mud flap bracket assembly with a separate end cap that is attached to a frame bracket without welds. In another of its aspects, the invention relates to a mud flap bracket assembly that has improved corrosion resistance. In another of its aspects, the invention relates to a mud flap bracket assembly that is assembled with multiple parts without welds.

2. Description of the Related Art

U.S. Pat. No. 6,604,724 to Hawes et al., U.S. Pat. No. 4,726,599 to Antekeier et al., U.S. Pat. No. 4,165,092 to Herlein, and U.S. Pat. No. 3,954,281 to Juergens disclose spring-biased mud flap bracket assemblies for mounting a mud flap to a vehicle frame.

Although these mudflap brackets have been very successful and very serviceable, brackets employ several welds that may leave small amounts of debris from the weld. If the debris is not removed with a cleaning operation, the paint layer applied to the finished bracket may flake off at the welds and show rust at an early stage of the service use. Although the rust does not materially affect the life of the bracket, it may appear to be unattractive to some truck and trailer owners. In any case, the weld and subsequent cleaning process and paint is an expensive process.

The reduction of wind resistance or drag on truck and trailer accessories is a continuous improvement process. Attempts are continually made to reduce drag and wind resistance to reduce fuel costs. The prior art mudflap brackets typically use a pair of longitudinal flanges beneath a tubular support to mount mudflaps. At least for shortie brackets that are used on tractor trucks, there is no uniform configuration of hole configurations and the flanges must be either custom made for different patterns of have slots to accommodate different hole pattern configuration of the mudflaps. These flanges are made of steel as is the tube support and thus add weight to the mudflap brackets and may also add wind resistance. If addition, the variety of mudflap patterns for shortie mudflaps may requires redundant inventory or custom fabrication of bracket for each different mudflap configuration.

Finally, aesthetics important to many customer. Ideally, the brackets can be made of stainless steel for more sophisticated truck and trailer owners. However, stainless steel is very expensive for mudflap brackets and add significant costs to the product. In addition, the painting process for high carbon steel can also be expensive to produce a quality product. In addition, the painted surfaces are subject to very corrosive environments deteriorate over the life of the brackets.

SUMMARY OF THE INVENTION

According to one embodiment of the invention, a mud flap bracket assembly comprises a frame bracket assembly including a frame seat having a front side configured to be mounted to a vehicle and rear side having a first spring mount projecting rearwardly; a structural frame bracket, a second spring mount connected to the frame bracket and a tension spring mounted to the seat first spring mount at one end and to the second spring mount at another end thereof to bias the frame seat to the structural frame bracket. In addition, a mudflap mounting fixture is connected to the structural frame and configured to mount a mudflap to the frame bracket.

In one embodiment, the frame bracket is formed from an elongated metal blank having a proximal end and a distal end. The bracket may have an elongated bottom portion and side portions bent upwardly to define an elongated U-shaped cross section. The second spring mount may be formed at least in part by an upwardly bent portion of the frame bracket bottom portion between the proximal and distal ends thereof. In addition, an end cap at a proximal end of the frame bracket bottom portion may be connected thereto through a weldless connection and spaced from the first spring support.

In another embodiment, the mudflap mounting fixture may have a portion extending downwardly below the frame bracket bottom portion and may be mounted thereto with a weldless connection.

In another embodiment, a cover may be coextensive with the frame bracket and may cover the upper and side portions of the frame bracket assembly. In addition, the cover may be configured to be secured to the frame bracket and the cover and frame bracket may have releasable connections. The releasable connections may be inwardly projecting tabs on lower portions of side walls of the cover and corresponding slots in the side portions of the frame bracket. In addition, the releasable connections may include screws.

In another embodiment, the cover maybe formed of one of stainless steel, plastic, composite and aluminum.

In yet another embodiment, the cover may have an open proximate end and a closed distal end. In addition, the cover may be tapered between the proximate and distal ends. Further, the cover may have an arcuate top portion and the closed distal end may be formed in a smooth curve.

In another embodiment, the frame bracket bottom portion may have pairs of spaced slots along the length thereof and the mudflap mounting fixture may include U-shaped clips mounted in the pairs of slots. A bite portion of the U-shaped clips may rest on the upper side of the bottom portion of the frame bracket and legs of the U-shaped clips may project through the slots and beneath the frame bracket. In addition, the slots may be elongated and have a dimension greater than the width of the U-shaped clips so that the U-shaped clips can be longitudinally adjustable in the elongated slots. The mudflap mounting fixture may further comprises apertures therethrough and bolts that may be adapted to pass through the apertures to mount a mudflap between the legs of the U-shaped clips. The U-shaped clips may further comprise locking tabs to preclude inadvertent decoupling of the U-shaped clips from the frame bracket.

In one embodiment, the end cap weldless connection may include frame retention clips that extend through slots in the frame bracket. Alternately, the end cap weldless connection may include an integral formation with the frame bracket.

Further according to the invention, a mud flap bracket assembly can include a seat having a front side configured to be mounted to a vehicle and rear side having a first spring mount projecting rearwardly; a mudflap hanger assembly for mounting a mudflap that can include a spring connected to the seat for biasing the hanger assembly to the seat; a structural frame bracket having a spring mount for mounting one end of the spring; a mudflap mounting fixture that can be connected to the structural frame and configured to mount a mudflap to the frame bracket; and a cover that is coextensive with the frame bracket and that covers the upper and side portions of the frame bracket assembly. The cover may be configured to be secured to the frame bracket.

In one embodiment, the cover may be configured to be secured to the frame bracket with releasable connections. The releasable connections may be inwardly projecting tabs on lower portions of side walls of the cover and corresponding slots in the side portions of the frame bracket. In addition, the releasable connections may include screws.

The cover may be formed of one of stainless steel, plastic, composite and aluminum.

The cover may have an open proximate end and a closed distal end. The cover may be tapered between the proximate and distal ends. The cover may also have an arcuate top portion and the closed distal end formed in a smooth curve.

DESCRIPTION OF AN EMBODIMENT OF THE INVENTION

Figure 1:
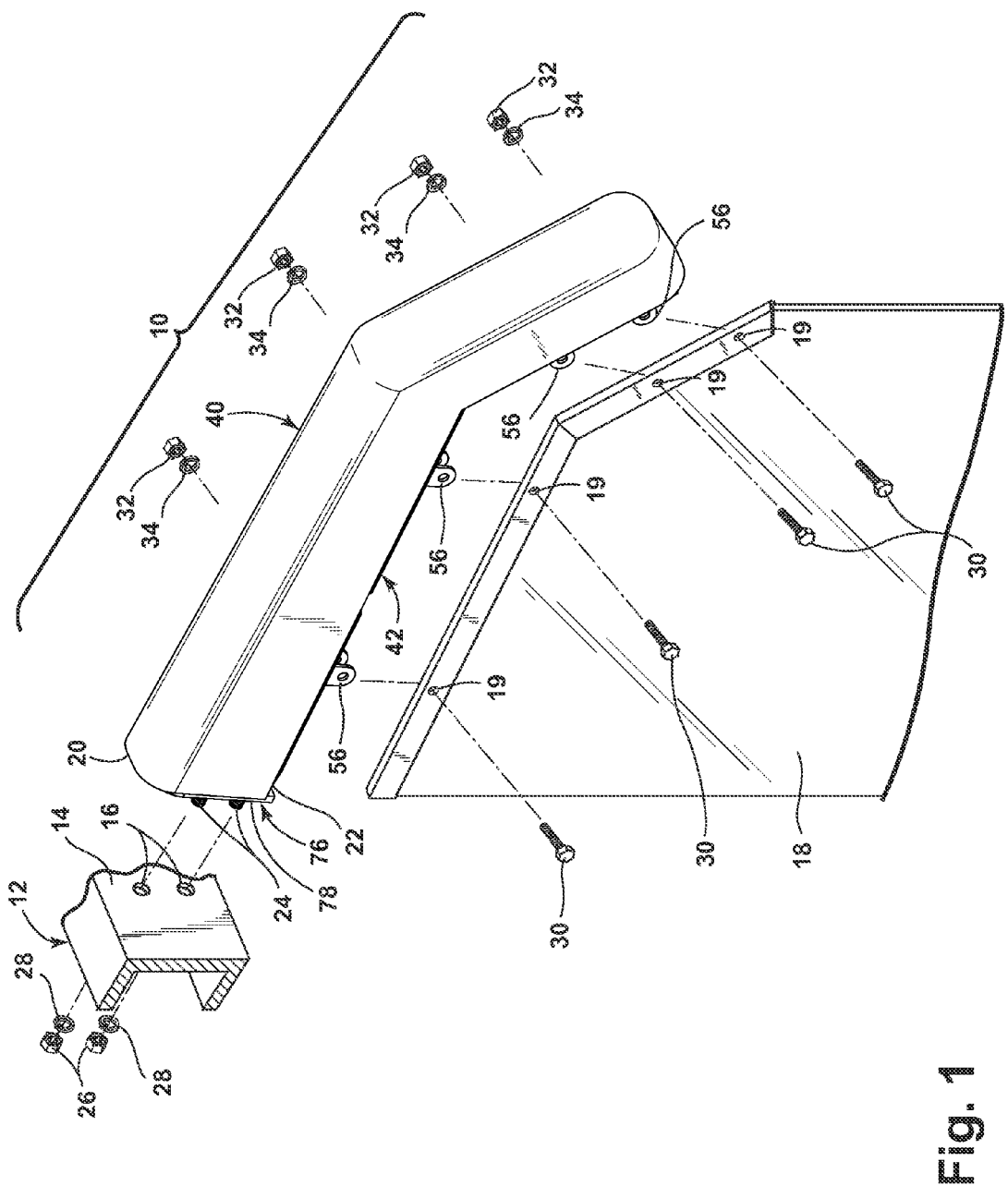
FIG. 1 is a perspective, partial view of a mud flap bracket assembly and its relationship to a vehicle frame, according to an embodiment of the invention, with a portion of the mud flap bracket assembly aligned to apertures formed in the vehicle frame.
Figure 2:
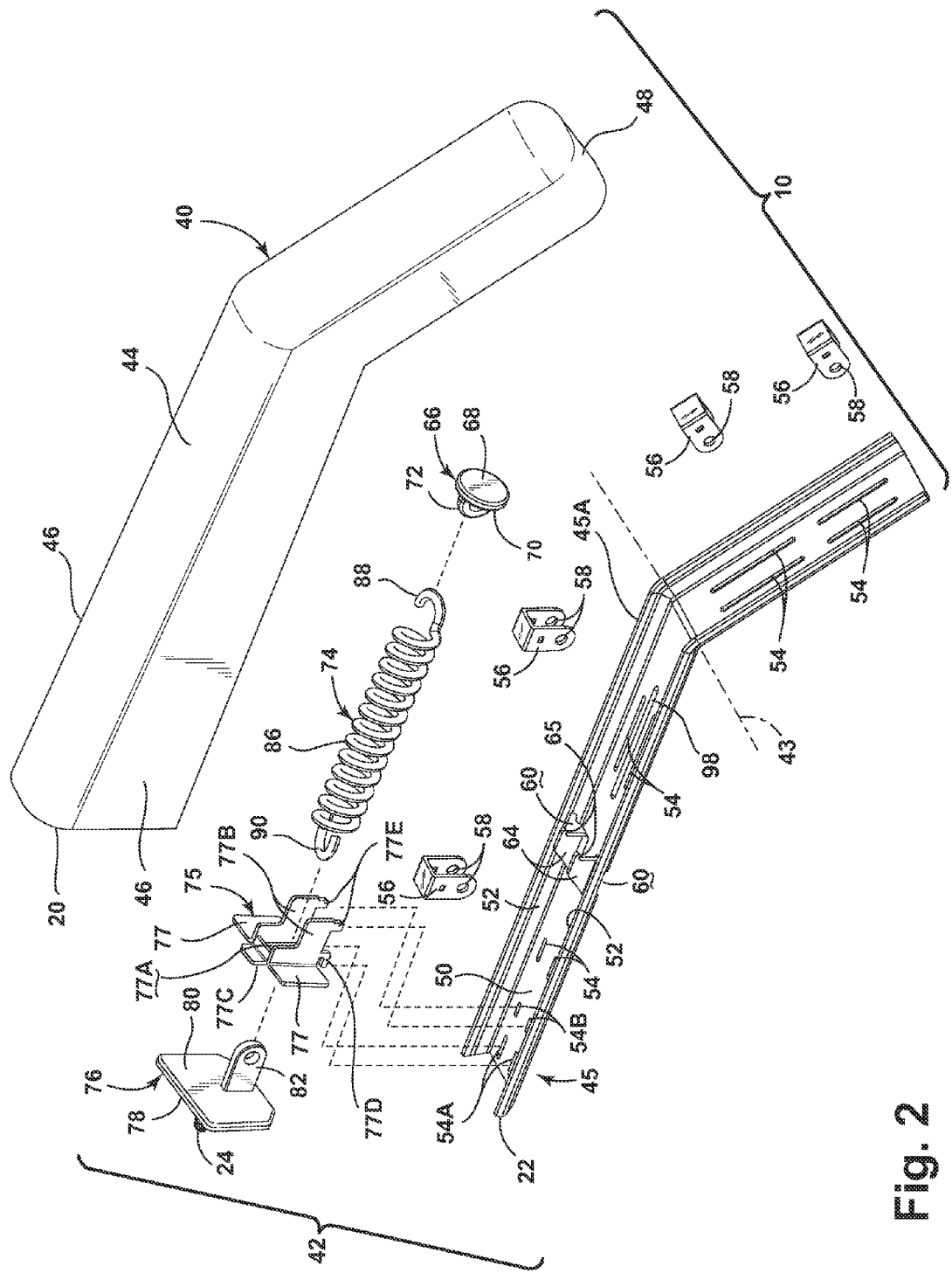
FIG. 2 is an exploded, perspective view of the mud flap bracket assembly of FIG. 1.

Referring to FIGS. 1 and 2, a mud flap bracket assembly 10 is configured to be mounted to a vehicle frame 12 having a frame surface 14 and to mount a mudflap 18 according to an embodiment of the invention. The frame surface 14 includes apertures 16 passing through the vehicle frame 12 to couple the vehicle frame 12 to the mud flap bracket assembly 10.

The mud flap bracket assembly 10 includes an elongated bracket cover 40 and a frame bracket assembly 42. The bracket cover 40 is essentially cosmetic and not a structural piece in the mud flap bracket assembly 10 and thus can be made of a variety of materials to suit the market in which the bracket assembly 10 is sold. For example, a variety of different bracket covers 40 can be produced with different finishes, can be made of different materials, for example, of aluminum, steel or molded composite or molded plastic, and can have accessories, such as reflectors mounted to a side thereof, and can have different shapes to account for different aerodynamic properties, all of which can be interchangeable with the same frame bracket assembly 42. The covers can be molded in a variety of colors to accommodate different truck and trailer color schemes and can be plated as well to have different metallic surface appearances. As illustrated, an end portion of the mud flap bracket assembly 10 can be optionally bent downwardly at a predetermined acute angle to accommodate configurations on some trailers and trucks. For example, about one-third of the bracket cover 40 and corresponding frame bracket assembly 42 can be bent downwardly to prevent the bracket assembly 10 from interfering with a landing gear on a truck. While the mud flap bracket assembly 10 is illustrated to be bent at an angle, it is also understood that the mud flap bracket assembly 10 can be unbent for conventional trailers.

As illustrated, the elongated bracket cover 40 has an open proximate end 20, an arched top 44 and two side walls 46, forming an inverted U-shaped transverse cross-sectional shape and a rounded closed distal end 48 formed by rounded side walls 46 and downwardly sloped top 44. At has least one of the two side walls 46 of the bracket cover 40 may be provided with one or more reflectors (not shown) along the longitudinal direction for night time visibility. The bracket cover 40 is tapered from the proximate end to the rounded distal end to reduce aerodynamic drag. The tapered arched top wall 44 and the smooth curved end 48 has an aerodynamic shape which reduces drag. The cover also has inwardly directed tabs 49 (FIGS. 6, 7) for mounting to the frame bracket 45 as disclosed below. In lieu of, or in addition to the tabs 49, machine screws 102 can be provided to removably fasten the cover 40 to the frame bracket 45.

Figure 8:
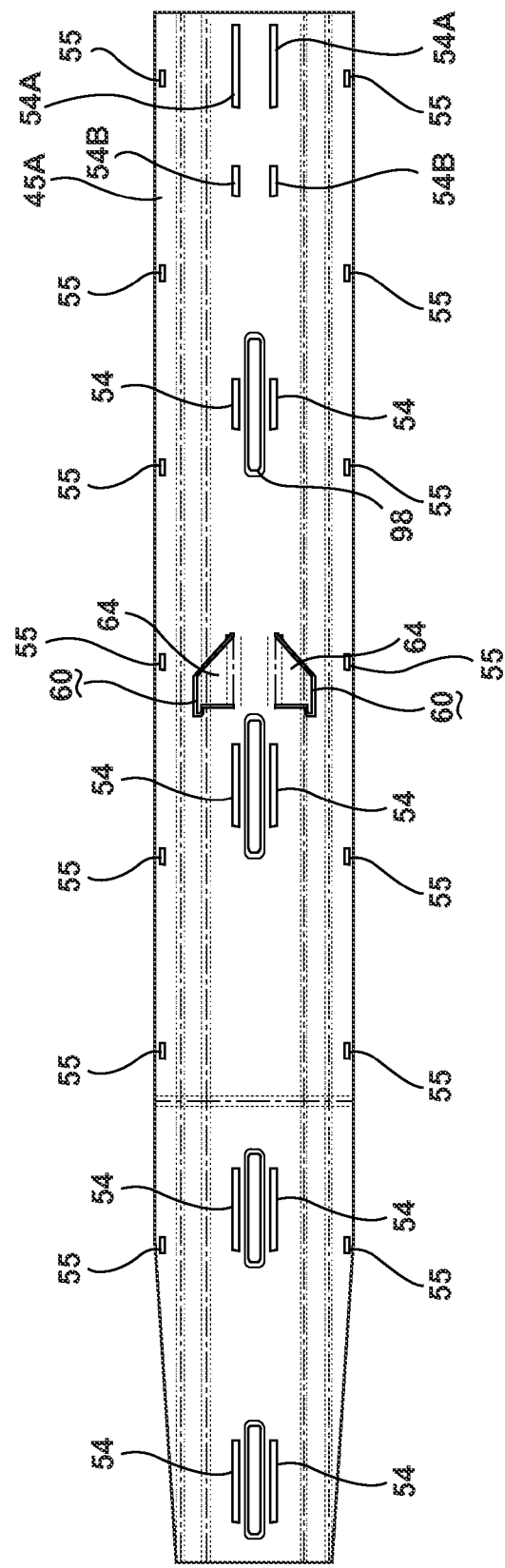
FIG. 8 is a plan view of a blank that is used to form the frame bracket that forms a part of the frame bracket assembly of FIG. 3.

The frame bracket assembly 42 comprises a frame bracket 45, an end cap 75, mudflap mounting fixture in the form of U-shaped clips 56, a spring mount 66, a coil tension spring 74, and a frame seat 76. The frame bracket 45 is formed of a single frame blank 45A illustrated in FIG. 8 of metal, such as steel, which is stamped with flap slots 54, slots 54A, 54B, cover slots 55 and bent into a shallow U-shape as separately illustrated in FIG. 8.

An end cap 75 is configured to be mounted on the frame bracket 45 close to the proximate end 22 thereof through a weldless coupling between frame retention clips that extend through slots 54A and 54B in the frame bracket 45. The end cap 75 is U-shaped with two wings 77 extending longitudinally from a bridge 77C coupling two wings 77. An opening 77A is formed between two wings 77. Two flanges 77B are arranged in parallel to each other along the longitudinal direction of the frame bracket 45. Each of flanges 77B includes an L-shaped clip 77D and a leg 77E, respectively, on the lower side of the flange 77B. The dimension of the L-shaped clip 77D and the leg 77E are configured to be received by slots 54A and 54B formed on the frame bracket 45 and retained therein against forces toward the distal end of the frame bracket 45. Thus, the dimensions between the L-shaped clip 77D and the leg 77E are such that they fit snugly into the slots 54A and 54B to preclude longitudinal movement along the axis of the frame bracket 45. The end cap 75 is assembled to the frame bracket by first inserting the L-shaped clip 77D into the slot 54A and then pushing it toward the proximate end of the frame bracket 45 while rotating the end cap 75 downwardly to seat the leg 77E firmly in the slot 54B. The end cap 75 can only be removed by rotating the end cap upwardly about the L-shaped clips 77D to dislodge the legs 77E from slots 54B and then moving the end cap 75 toward the distal end of the frame bracket 45 to free the L-shaped clips 77D from the slots 54A. It may be noted that the leg 77E may have other shape or configuration. For example, leg 77E may have L-shape.

The frame seat 76 is configured to abut one side of the end cap 75, and includes a plurality of studs 24 that are configured to be mounted to a vehicle frame 12 through apertures 16. The studs 24 may be in the form of the threaded studs to be received by the apertures 16 formed in the vehicle frame 12. The threaded studs 24 are fastened to the vehicle frame 12 by fasteners such as nuts 26 and lock washers 28.

The frame seat 76 is generally in a rectangular shape with one or more corner cuts, with the dimension of frame seat 76 configured to cover the open proximate end 20 of the bracket cover 40 and to abut the end cap 75. The frame seat 76 includes two flat sides. A first side 78 of the frame seat 76 includes a plurality of threaded holes 81 that are adapted to threadably receive threaded studs 24. The threaded studs 24 extend outwardly and are adapted to match apertures formed in the corresponding apertures 16 in the vehicle frame 12, as illustrated in FIG. 1. A second side 80 of the frame seat 76 includes an eye coupler 82 that protrudes from the second side 80 through the opening 77A of the end cap 75 to receive a hook coupling 90 of the tension spring 74. It may be understood that, in another embodiment, a pair of integral vertical supports, similar to the vertical supports 64, may replace the end cap 75 in coupling the frame sear 76 to the hook 90 of the tension spring 74. For example, the second side 80 of the frame seat 76 may be configured to include one or more recesses that are adapted to match the protrusions of the vertical supports that may replace the end cap 75.

The mudflap mounting clips 56 are coupled to the frame bracket 45 to provide couplings to the mud flap 18. The clip 56 is mounted in each pair of the flap slots 54 to mount the flap 18 (FIG. 1) to the frame bracket 45. The clips 56 is in the form of a U-shape wherein a bite portion of the U-shaped clips 56 rest on the upper side of the bottom portion 50 of the frame bracket 45 and legs of the U-shaped clips 56 project through the slots 54 and beneath the frame bracket 45. Apertures 58 are provided in the legs and receive fasteners that mount the mud flap to the clips 56. The slots 54 are elongated and have a dimension greater than the width of the U-shaped clips 56 so that the U-shaped clips 56 are longitudinally adjustable in the elongated slots 54. The thickness and width of U-shaped clip 56 may be configured to move the U-shaped clip 56 adjustably in either direction along the flap slot 54. While the clip 56 is described in the form of the U-shape, other clip configurations having different numbers of apertures are also possible. The mud flap 18 includes apertures 19 which are configured to receive fasteners, such as threaded screws 30 and corresponding nuts 32 and lock washers 34, to couple the mud flap 18 to the mud flap bracket assembly 10.

The mud flap bracket assembly 10 includes the bracket cover 40 and the frame bracket assembly 42, with both the bracket cover 40 and frame bracket assembly 42 bent at a predetermined angle, while the mud flap bracket assembly 10 may be unbent in another embodiment.

Figure 7:
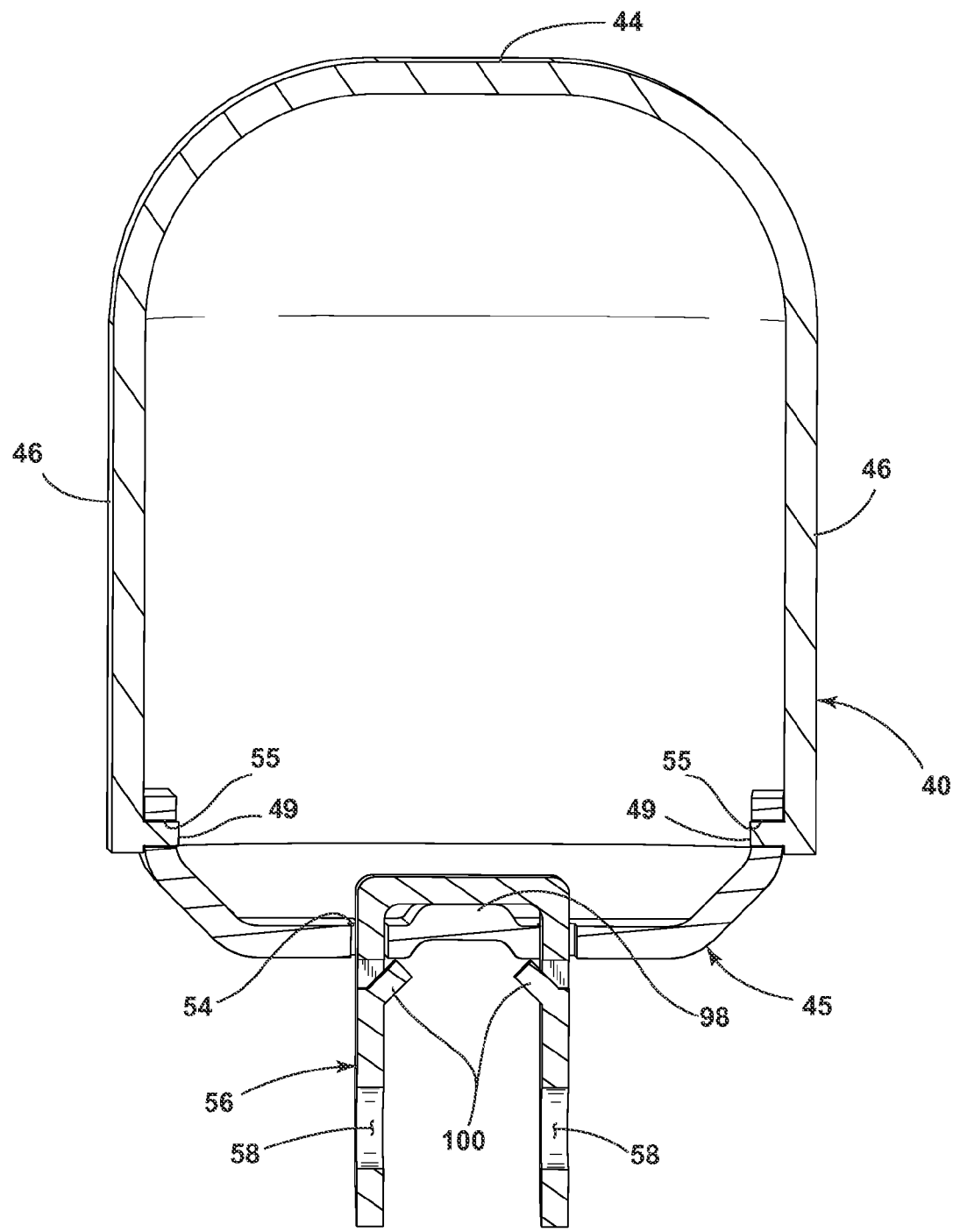
FIG. 7 is a cross-sectional view taken along lines VII-VII of FIG. 6, showing a clip received by a flap slot of a frame bracket and the attachment of the cover to the frame bracket.

The frame bracket assembly 42 may include a bottom portion 50 and two side walls 52, with two side walls 52 bent upwardly relative to the bottom portion 50 at a predetermined angle to be received by the two side walls 46 of the bracket cover 40. As illustrated in FIG. 7, the inwardly directed tabs 49 fit within the cover slots 55 to removably retain the cover 40 on the frame bracket 45. In this manner, the cover 40 can be snapped onto the frame bracket and perhaps replaced in the event the original cover is damaged or becomes unattractive due to wear and corrosion. Also as illustrated, the cover 40 can be removably mounted to the frame bracket 45 though machine screws 102 can pass through screw holes 104 in the cover 40 and retained in a tapped hole 106 in the frame bracket 45.

A portion of the frame bracket assembly 42 is bent downwardly at an angle with a transverse reference line 43 to maintain a facing relationship with the corresponding bracket cover 40. The overall geometrical dimension of the frame bracket assembly 42 is configured to be received by the bracket cover 40.

The frame bracket 45 includes multiple pairs of flap slots 54 on the bottom portion 50 thereof with a predetermined spacing between adjacent flap slots 54. The flap slots 54 are typically positioned parallel to the longitudinal direction of the frame bracket 45.

A pair of openings 60 is formed in the bottom portion 50 of the frame bracket 45. The openings 60 are formed by incising portions of the frame blank 45A in a predetermined pattern, followed by bending the incised portions upwardly, to form vertical supports 64. The vertical supports 64 are generally triangular while other shapes are also possible for the vertical supports 64. For example, the vertical support can be in the rectangular or trapezoidal configuration. The vertical supports 64 are typically arranged in a pair in a symmetrical way with respect to a longitudinal direction of the frame bracket 45. It is noted that each of the vertical supports 64 includes a vertical side having a protrusion 65 at the top corner of the vertical supports 64 with the protrusions 65 on the vertical supports 64 facing the distal end 48.

A spring mount 66 includes an end retainer 68 with an eye coupler 72 mounted to one side of the end retainer 68 to provide a coupling for a hook 88 of a tension spring 74. The end retainer 68 is configured to abut the vertical supports 64 to retain one end of the tension spring 74 at the vertical supports 64.

The tension spring 74 extends in a longitudinal direction of the frame bracket 45, and hooks 88, 90 at opposite ends of the spring 86 to provide couplings for the spring mount 66 and the frame seat 76.

Figure 3:
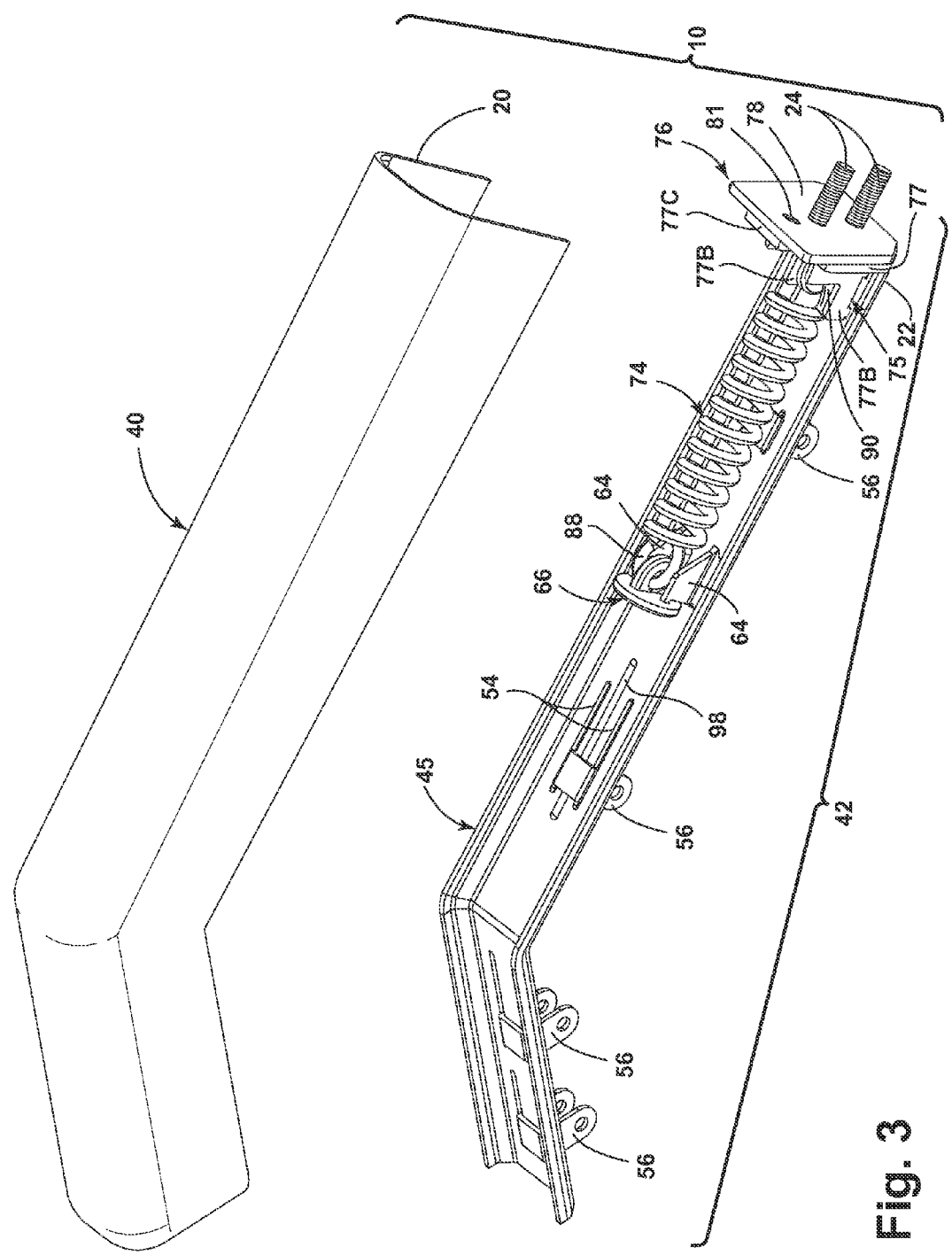
FIG. 3 is a perspective view of the frame bracket assembly and the bracket cover of the mud flap bracket assembly of FIG. 1.
Figure 4:
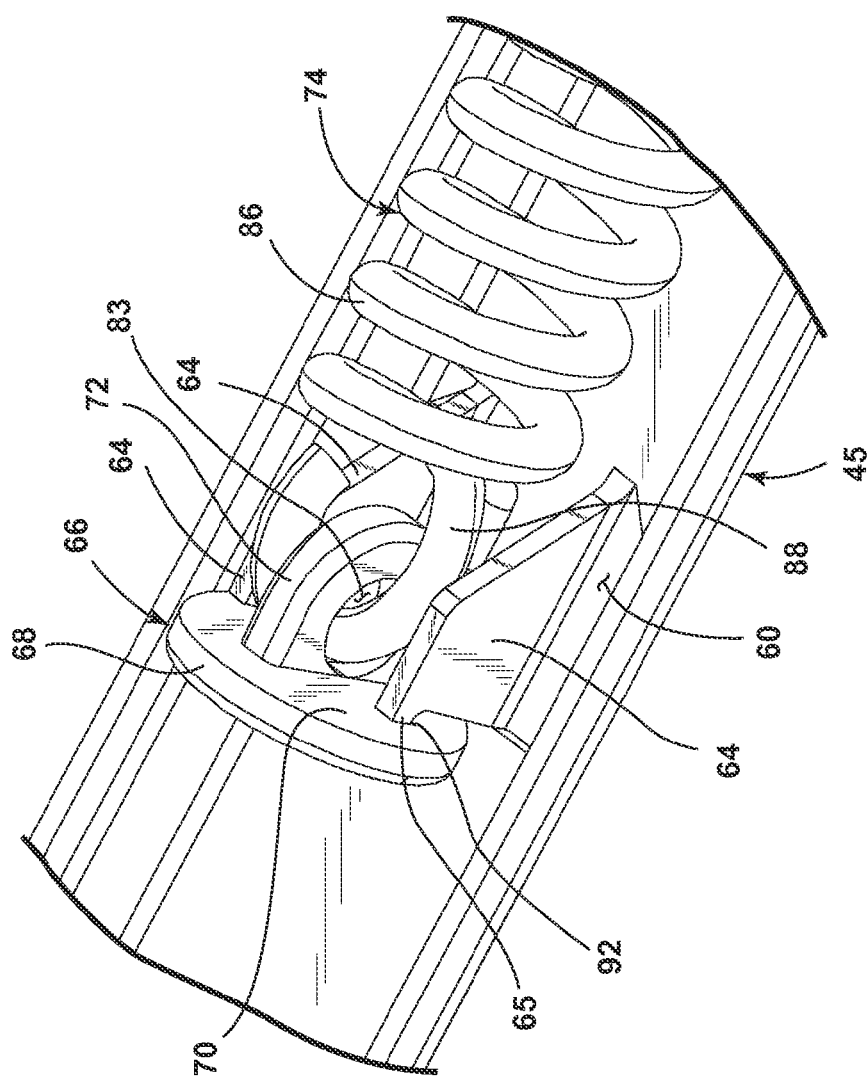
FIG. 4 is an enlarged, perspective view of the relationship between a spring mount and vertical supports, with a tension spring coupled to a spring mount of the frame bracket assembly of FIG. 3.
Figure 5:
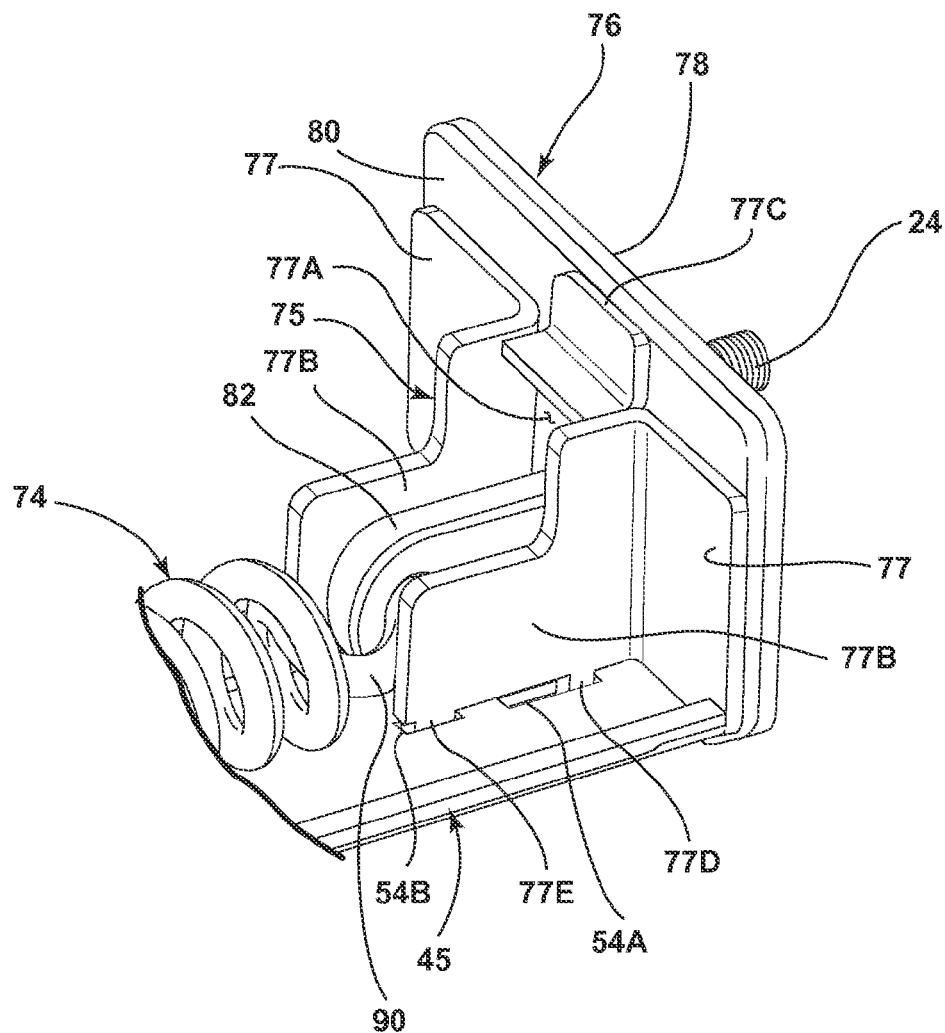
FIG. 5 is an enlarged, perspective view of the relationship between a frame seat and vertical supports, with the tension spring coupled to the frame seat of the frame bracket assembly of FIG. 3.

Referring to FIGS. 3-5, the first and second hooks 88, 90 of the tension spring 74 are coupled to the spring mount 66 at one end and the frame seat 76, respectively, at the other end by stretching the tension spring 74 and inserting the hooks 88, 90 in the in the eye couplers 72 and 82, respectively. When the tension spring 74 is extended in the longitudinal direction, the tension force of the tension spring 74 draws the frame seat 76 against the end cap 75 which abuts the proximate end 22 of the frame bracket 45. At the same time, the tension force draws the spring mount 66 against the vertical supports 64 to bias the frame seat 76 against the frame bracket 45.

FIG. 4 illustrates an enlarged, perspective view of the first hook 88 of the tension spring 74 elastically coupled to the aperture 83 of the coupler 72. As illustrated, the spring mount 66 is vertically arranged with respect to the bottom of the frame bracket 45, and supported by two vertical supports 64.

When the tension spring 74 extends, the tension force of the tension spring 74 draws the spring mount 66 against the vertical supports 64.

While the first side 70 of the end retainer 68 of the spring mount 66 can be flat, it is noted that the first side 70 of the end retainer 68 can include a recesses 92 that are adapted to receive the protrusions 65 of the vertical supports 64. This configuration improves the positional stability of the spring mount 66 with respect to the vertical supports 64. For example, when the tension spring 74 extends in the longitudinal direction of the frame bracket 45, the tension force pulls the spring mount 66 against the protrusions 65, resulting in an improved coupling between the spring mount 66 and the vertical supports 64. Further, the configuration in FIG. 4 avoids the use of any fasteners such as studs, bolt or nut in fixing the spring mount 66 in the frame bracket assembly 42. Therefore, material cost and manufacturing cost reduced. The recesses 92 can extend part way of fully through the end retainer 68. The frame seat 76, end cap 75, spring mount 76 and tension spring 74 provide articulation of the mounting bracket assembly 10 with respect to the vehicle in the same manner as disclosed in Juergens U.S. Pat. No. 3,954,281 and Haws, et al. U.S. Pat. No. 6,604,724.

FIG. 5 illustrates an enlarged, perspective view of the frame seat 76 which is vertically supported by the end cap 75, which is received by the frame bracket 45. As illustrated, the frame seat 76 is vertically positioned relative to the frame bracket 45. The end cap 75, which is coupled to the frame bracket 45 by the L-shaped clip 77D and the leg 77E, vertically supports the frame seat 76 against the tension force of the tension spring 74.

In another embodiment, the end cap 75 can be replaced with a pair of the vertical supports, which are practically identical to the vertical supports 64, in supporting the frame seat 76. The vertical supports, similar to the vertical supports 62, can be formed by incising the bottom of the frame bracket assembly 42 to support the frame seat 76 against the tension force of the tension spring 74. Similar to FIG. 4, a protrusion may be formed at one corner of the vertical support and is received in the recess formed in the second side 80 of the frame seat 76. The recess can extend partially or fully through the frame seat 76.

Figure 6:
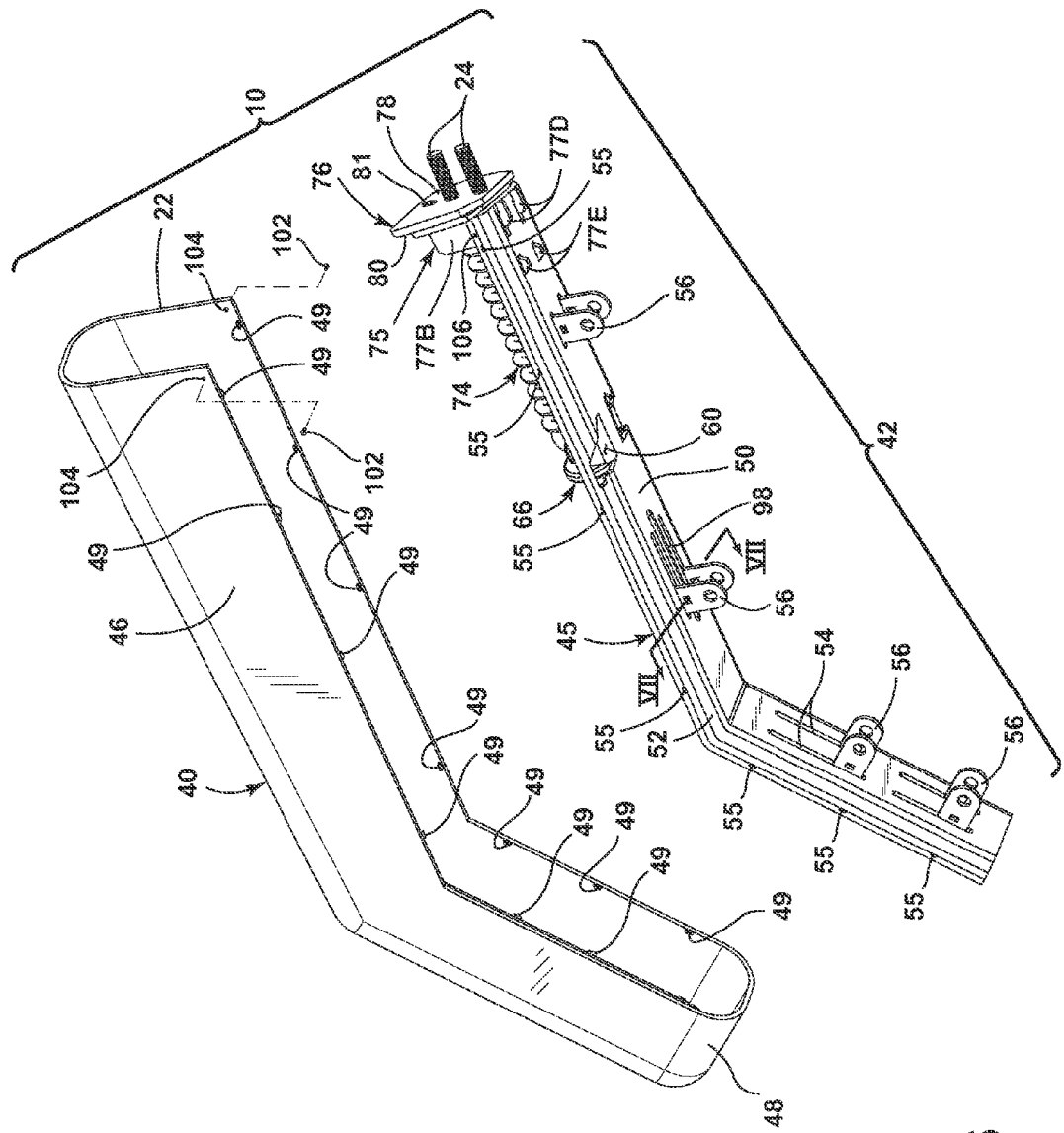
FIG. 6 is a bottom up perspective view of the frame bracket assembly and the bracket cover of the mud flap bracket assembly of FIG. 1.

FIG. 6 illustrates a bottom perspective view of the frame bracket assembly 42 and the bracket cover 40. U-shaped clips 56 are mounted in the flap slots 54 formed in the bottom 50 portion of the frame bracket 45 to move the individual U-shaped clips 56 along the flap slots 54. This clip and slot configuration enables the user to couple a variety of different mudflaps with different aperture configurations to the mud flap bracket assembly 10.

A rib 98 can be selectively formed on a bottom portion 50 between two facing flap slots 54 to provide the frame bracket 45 with improved mechanical strength when the gravitational force from the weight of the mud flap 18 exerts downwardly on the clip 56. In another embodiment, a recess may be formed in replace of the rib 98 for enhanced mechanical stability.

The first side 78 of the frame seat 76 includes two threaded holes 81 to receive two threaded studs 24 which threaded into the two threaded holes. It is understood that more than two thread holes can be formed to adapt to other configuration of apertures 16 formed in the vehicle frame 12. While the threaded studs 24 are illustrated to couple the vehicle surface 14 to the mud flap bracket assembly 10, other types of fasteners such as screws or bolts can be also used for coupling.

FIG. 7 illustrates a cross-sectional view of the U-shaped clip 56 received by the flap slot 54 of the frame bracket 45. As illustrated, one or more locking tabs 100 are provided to at least inner side of the clip 56 to secure the coupling between the clip 56 and the flap slot 54. For example, two locking tabs 100 are formed in a facing relationship in a way that the clip 56 retains the clip in the frame bracket 45 once the clip 56 is positioned within the flap slot 54, which prevents from inadvertent decoupling of the clips 56 from the frame bracket 45.

The invention provides a several advantages over prior mud flap assemblies. First, the invention provides the mud flap bracket assembly with an interchangeable bracket cover that can be selected for aesthetic, weight, aerodynamics, reflective, corrosion resistance or other characteristics for mounting to the same structural and functional frame bracket assembly. Unlike other mud flap mounting assemblies having an integrated bracket assembly, the invention can combine any bracket cover and the same frame bracket assembly to form the mud flap bracket assembly based on the user's needs, cost considerations and corrosion resistance. For example, the user may select the bracket cover with a specific reflector design to combine with the frame bracket assembly with customized number of clips. In addition, the bracket cover can be made of a composite material or can be galvanized or E- or powder coated. In addition, the bracket cover is replaceable in the event that the original bracket cover is damaged or otherwise disfigured in use. Further, the bracket cover is typically made of a light-weight plastic material or aluminum that is not corrosive like steel brackets and thus are more aesthetically pleasing over the life of the mudflap bracket assembly.

Second, the spring mounts are integrated into the frame bracket without using any fasteners or welds, which can lead to a lower manufacturing costs and improved corrosion resistance. In addition, a frame seat is mounted to the frame bracket with integral frame seat supports, also avoiding attachment hardware or welds, further reducing manufacturing costs and weld operations and further enhancing corrosion resistance. Specifically, recesses formed in the spring mount are adapted to receive the protrusions formed in the vertical supports to further improve the coupling between the spring mount and the frame bracket assembly.

Third, the clip mounted on the flap slot can move along the flap slot, adjusting the separation between the apertures of clips. As a result, other mud flaps having different separation between the apertures can be used, expanding the adaptability of the mud flap bracket assembly.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A mud flap bracket assembly comprising;
   a frame bracket assembly comprising:
   a frame seat having a front side configured to be mounted to a vehicle and rear side having a first spring mount projecting rearwardly therefrom;
   a frame bracket formed from an elongated metal blank having a proximal end and a distal end, the bracket having
   an elongated bottom portion and side portions bent upwardly to define an elongated U-shaped cross section;
   a second spring mount formed at least in part by an upwardly bent portion of the bottom portion between the proximal and distal ends thereof and spaced from the first spring mount;

an end cap, connected to the second spring mount through a weldless connection;

a tension spring mounted to the seat first spring mount at one end and to the second spring mount at another end thereof; and a mudflap mounting fixture having a portion extending downwardly below the bottom portion and mounted thereto with a weldless connection, wherein the fixture is configured to mount a mudflap to the frame bracket.

2. The mud flap bracket assembly of claim 1 and further comprising a cover that is coextensive with the frame bracket and covers the upper and side portions of the frame bracket assembly, wherein the cover is configured to be secured to the frame bracket.

3. The mud flap bracket assembly of claim 2 wherein the cover and frame bracket have releasable connections.

4. The mud flap bracket assembly of claim 3 wherein the releasable connections comprise inwardly projecting tabs on lower portions of side walls of the cover and corresponding slots in the side portions of the frame bracket.

5. The mud flap bracket assembly of claim 3 wherein the releasable connections comprise screws.

6. The mud flap bracket assembly of claim 2 wherein the cover is formed of one of stainless steel, plastic, composite and aluminum.

7. The mud flap bracket assembly of claim 2 wherein the cover has an open proximate end and a closed distal end.

8. The mud flap bracket assembly of claim 7 wherein the cover is tapered between the proximate and distal ends.

9. The mud flap bracket assembly of claim 8 wherein the cover has an arcuate top portion and the closed distal end is formed in a smooth curve.

10. The mud flap bracket assembly of claim 1 wherein the frame bracket bottom portion has pairs of spaced slots along the length thereof and the mudflap mounting fixture comprises U-shaped clips mounted in the pairs of slots, whereby a bite portion of the U-shaped clips rests on the upper side of the bottom portion of the frame bracket and legs of the U-shaped clips project through the slots and beneath the frame bracket.

11. The mud flap bracket assembly of claim 10 wherein the slots are elongated and have a dimension greater than the width of the U-shaped clips so that the U-shaped clips are longitudinally adjustable in the elongated slots.

12. The mud flap bracket assembly of claim 11 wherein the mudflap mounting fixture further comprises apertures therethrough and bolts that are adapted to pass through the apertures to mount a mudflap between the legs of the U-shaped clips.

13. The mud flap bracket assembly of claim 10 wherein the U-shaped clips further comprise locking tabs to preclude inadvertent decoupling of the U-shaped clips from the frame bracket.

14. The mud flap bracket assembly of claim 1 wherein the end cap weldless connection comprises frame retention clips that extend through slots in the frame bracket.

15. The mud flap bracket assembly of claim 1 wherein the end cap weldless connection comprises an integral formation with the frame bracket.

16. A mud flap bracket assembly comprising;

a seat having a front side configured to be mounted to a vehicle and rear side having a first spring mount projecting rearwardly therefrom;

a mudflap hanger assembly for mounting a mudflap including a spring connected to the seat for biasing the hanger assembly to the seat and comprising:

an elongated structural frame bracket having a second spring mount for mounting one end of the spring;

a mudflap mounting fixture connected to the structural frame and configured to mount a mudflap to the frame bracket; and a non-structural cover that is coextensive with the frame bracket and has an open proximate end and a closed distal end that covers the upper and side portions of the frame bracket assembly, wherein the cover is configured to be secured to the frame bracket with a releasable connections.

17. The mud flap bracket assembly of claim 16 wherein the releasable connections comprise inwardly projecting tabs on lower portions of side walls of the cover and corresponding slots in the side portions of the frame bracket.

18. The mud flap bracket assembly of claim 16 wherein the releasable connections comprise screws.

19. The mud flap bracket assembly of claim 16 wherein the cover is formed of one of stainless steel, plastic, composite and aluminum.

20. The mud flap bracket assembly of claim 16 wherein the cover is tapered between the proximate and distal ends.

21. The mud flap bracket assembly of claim 20 wherein the cover has an arcuate top portion and the closed distal end is formed in a smooth curve.

* * * * *